(12) United States Patent
Deng

(10) Patent No.: US 10,784,002 B2
(45) Date of Patent: Sep. 22, 2020

(54) NUCLEAR REACTOR COOLING SYSTEM

(71) Applicant: Sichuan Xingzhi Zhihui Intellectual Property Operation Co., Ltd., Chengdu, Sichuan (CN)

(72) Inventor: Liping Deng, Sichuan (CN)

(73) Assignee: Sichuan Xingzhi Zhihui Intellectual Property Operation Co., Ltd., Chengdu (CN)

( * ) Notice: Subject to any disclaimer, the term of this patent is extended or adjusted under 35 U.S.C. 154(b) by 452 days.

(21) Appl. No.: 15/821,926

(22) Filed: Nov. 24, 2017

(65) Prior Publication Data
US 2018/0358138 A1 Dec. 13, 2018

(30) Foreign Application Priority Data
Jun. 9, 2017 (CN) .......................... 2017 1 0432819

(51) Int. Cl.
*G21C 15/18* (2006.01)
*G21C 9/012* (2006.01)
*G21C 15/12* (2006.01)
*G21C 15/243* (2006.01)

(52) U.S. Cl.
CPC ............. *G21C 15/18* (2013.01); *G21C 9/012* (2013.01); *G21C 15/12* (2013.01); *G21C 15/243* (2013.01); *Y02E 30/40* (2013.01)

(58) Field of Classification Search
CPC .................................. G21C 15/18; G21C 15/12
See application file for complete search history.

(56) References Cited

U.S. PATENT DOCUMENTS

| 4,753,771 A * | 6/1988 | Conway ................. | G21C 15/18 376/282 |
| 5,049,353 A * | 9/1991 | Conway ................. | G21C 15/18 376/293 |
| 2009/0323884 A1* | 12/2009 | Sato ........................ | G21C 13/00 376/283 |
| 2013/0272474 A1* | 10/2013 | Conway ............... | G21C 13/022 376/299 |
| 2017/0162282 A1* | 6/2017 | Lin ....................... | G21C 15/182 |

FOREIGN PATENT DOCUMENTS

| CN | 103489490 A | 1/2014 |
| CN | 203839055 U | 9/2014 |

OTHER PUBLICATIONS

Bajorek, S. "AP1000 Passive Safety Systems" NRC Presentation, Aug. 2007, available at https://www.nrc.gov/docs/ML1523/ML15230A043.pdf. (Year: 2007).*

* cited by examiner

*Primary Examiner* — Sharon M Davis

(57) ABSTRACT

A nuclear reactor cooling system includes a cooling water tank disposed above a containment; a spray header connected to the cooling water tank through a first communicating pipe; and an air tank disposed inside the containment; wherein the spray header is disposed outside the containment and used for spraying cooling water to the outer wall of the containment; the cooling water tank is a closed container, and the air tank is connected to the top portion of the cooling water tank through a second communicating pipe. The nuclear reactor cooling system has higher reliability in cooling containment.

12 Claims, 1 Drawing Sheet

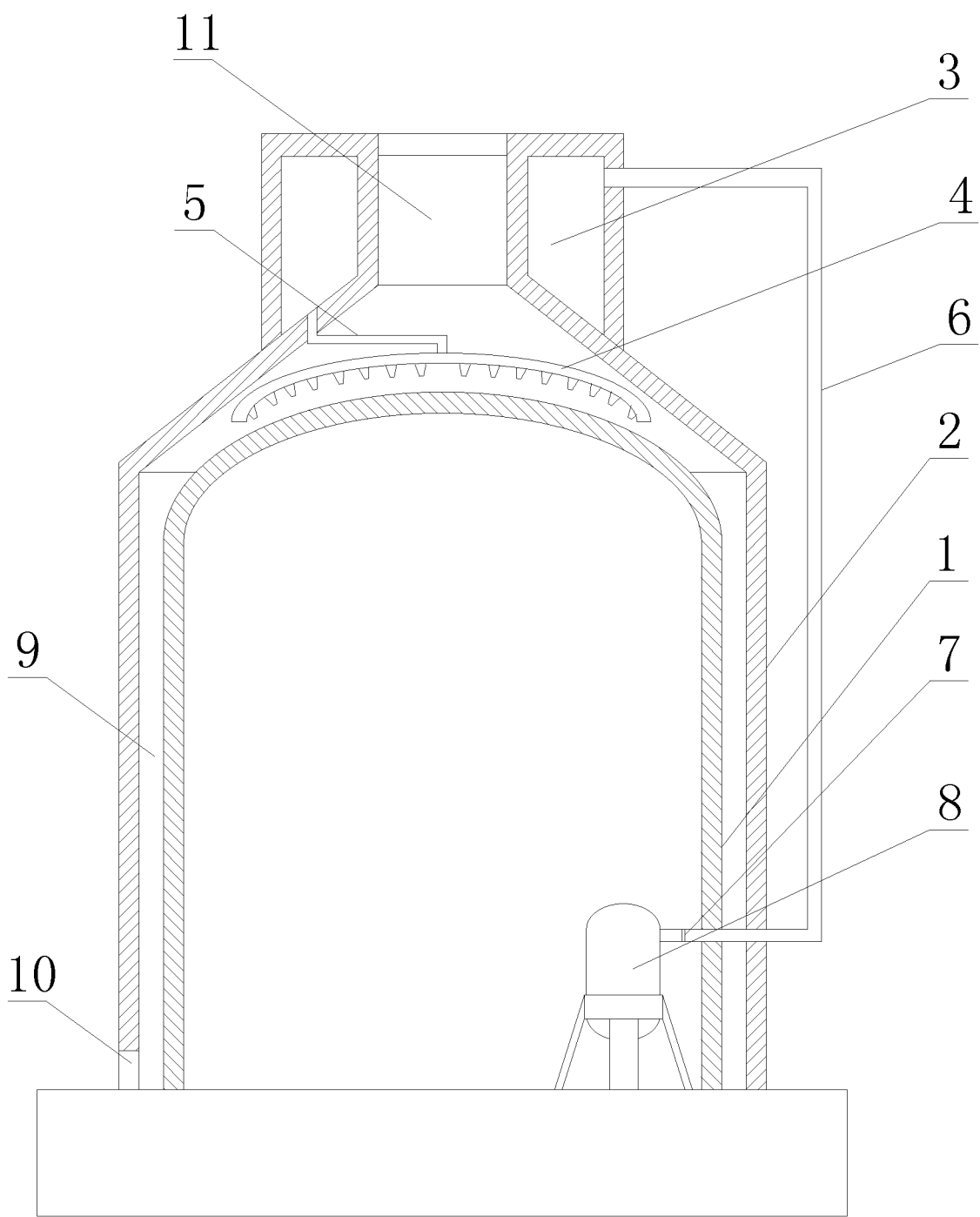

NUCLEAR REACTOR COOLING SYSTEM

RELATED APPLICATION(S)

This application claims priority to Chinese Patent Application No. 201710432819.9 filed on Jun. 9, 2017, the contents of which are hereby incorporated by reference in their entirety.

FIELD OF THE INVENTION

The present invention relates to nuclear reactor apparatus technology, and more particularly to a nuclear reactor cooling system.

BACKGROUND OF THE INVENTION

Nuclear reactor is an apparatus used for starting, controlling and maintaining the nuclear fission or fusion chain reaction. The reaction rate of the nuclear reactor can be controlled precisely so as to release the energy at a slow speed for the use of people. There are various uses of the nuclear reactor, the most important one is to replace other fuel to generate heat as the steam electric power or the power for driving large apparatuses such as aircraft carrier. Nuclear power generated from the nuclear reactor is an important power resource that any possible fault occurs during the operation of the nuclear reactor should not be overlooked. Containment Spray System (EAS) is a protection system used to lower the pressure and the temperature in the containment when coolant accident happens in the primary circuit.

In the existing art, as a protection system capable of running in a condition of power outage, passive containment spray system guarantees the safety of the nuclear reactor. Therefore, further optimizing the structure of the passive containment spay system to improve the reliability in cooling containment is an important research direction for skilled person in the art.

BRIEF SUMMARY OF THE INVENTION

Therefore, the present invention provides a nuclear reactor cooling system with higher reliability in cooling containment.

According to an embodiment of the present invention, the nuclear reactor cooling system comprises: a cooling water tank disposed above a containment; a spray header connected to the cooling water tank through a first communicating pipe; and an air tank disposed inside the containment; wherein the spray header is disposed outside the containment and used for spraying cooling water to an outer wall of the containment; the cooling water tank is a closed container, and the air tank is connected to a top portion of the cooling water tank through a second communicating pipe.

Specifically, the cooling water tank is used to store cooling water which is used as containment coolant. Disposing the cooling water tank above the containment makes the cooling water in the cooling water tank flow into the spray header through the first communicating pipe under gravity and then spray to the outer wall of the containment via the spray header, cooling the containment. Meanwhile, the air tank used to store gas is disposed inside the containment with its internal pressure affected by the temperature in the containment, therefore once the cooling water leak happens in the primary circuit, the temperature in the containment increases and the gas in the air tank expands, increasing the pressure in the cooling water tank. The increased pressure allows the cooling water flow into the spray header more quickly, increasing the flow rate of the cooling water. The faster the temperature in the containment increases, the larger the flow rate becomes, enhancing the cooling ability to the containment, bringing higher reliability of the cooling system.

In another embodiment according to the previous embodiment, in order to get a full contact between the outer wall of the containment and the cooling water so as to improve the cooling effect for the containment and in order to collect the cold fluid after the heat exchange between the containment and the cooling water, the nuclear reactor cooling system further comprises a bell shaped shield, wherein the shield is used for covering the containment and setting the containment in its interior, the spray header is disposed in a space between an inner wall of the shield and the outer wall the containment, and the cooling water tank is disposed on a top portion of the shield. The space between the inner wall of the shield and the outer wall the containment is a flow passage for the cold fluid, wherein the cold fluid includes liquid cooling water and gaseous steam formed in the heat exchange between the containment and the cooling water. When the cooling water falls onto the outer wall of the containment, some of it is heated into gaseous steam, and the rest remains liquid.

In another embodiment according to the previous embodiment, the nuclear reactor cooling system further comprises an exhaust hole disposed on the top portion of the shield, connecting the space between the shield and the containment with the outer space of the shield so as to stop the temperature of the cold fluid outside the containment from increasing to a high level to affect the heat exchange between the cold fluid and the containment.

In another embodiment according to the previous embodiment, the cooling water tank has a shape of annulus and its axis is collinear with that of the shield, bringing stronger stability of the nuclear reactor cooling system.

In another embodiment according to the previous embodiment, the nuclear reactor cooling system further comprises a cooling water outlet disposed on a bottom portion of the shield to discharge the cold fluid in the space between the shield and the containment timely, bringing high-efficiency cooling for the containment.

In another embodiment according to the previous embodiment, for there are many communicating pipes and nozzles disposed on the spray header, the spray header is axisymmetrically disposed above the containment, cooling the containment uniformly and enabling stronger stability of the nuclear reactor cooling system.

In another embodiment according to the previous embodiment, the nuclear reactor cooling system further comprises a rupture disk disposed in the air tank and/or in the second communicating pipe, wherein the rupture disk is ruptured during an increase of pressure in the air tank, and the rupture disk in an intact state is capable of isolating a space on both sides thereof. During the normal operation of the reactor, the temperature in the containment fluctuates in a small range resulting in small change of the pressure in the containment, so that the cooling water stored in the cooling water tank can spray out in normal condition, in order to avoid the aforementioned situation, the rupture disk is disposed in the air tank and/or in the second communicating pipe. The rupture disk is preferably fixed in a pipe which is removable from the second communicating pipe and located outside the containment, so as to replace the rupture disk or the assembly of rupture disk and the pipe after the rupture of the repture disk. In this way, when the pressure in the space between the air tank and the rupture disk increases to a certain pressure, the rupture disk ruptures and the cooling water in the cooling water tank flows into the spay header and is spayed to the outer wall of the containment, cooling the containment.

Compared to the existing art, the present invention has advantages and beneficial effects as follows:

The cooling water tank is used to store cooling water which is used as containment coolant. Disposing the cooling water tank above the containment makes the cooling water flow into the spray header from the cooling water tank through the first communicating pipe under gravity and then spray to the outer wall of the containment via the spray header, cooling the containment. Meanwhile, the air tank used to store gas is disposed inside the containment with its internal pressure affected by the temperature in the containment, therefore once the cooling water leak happens in the primary circuit, the temperature in the containment increases and the gas in the air tank expands, increasing the pressure in the cooling water tank. The increased pressure allows the cooling water flow into the spray header more quickly, increasing the flow rate of the cooling water. The faster the temperature in the containment increases, the larger the flow rate becomes, enhancing the cooling ability to the containment, bringing higher reliability of the cooling system.

For making the above and other purposes, features and benefits become more readily apparent to those ordinarily skilled in the art, the preferred embodiments and the detailed descriptions with accompanying drawings will be put forward in the following descriptions.

BRIEF DESCRIPTION OF THE DRAWINGS

The present invention will become more readily apparent to those ordinarily skilled in the art after reviewing the following detailed description and accompanying drawing, in which:

The FIGURE is a cross-sectional view of the nuclear reactor cooling system according to an embodiment of the present invention.

DETAILED DESCRIPTION OF THE PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Embodiment 1

As is shown in the FIGURE, a nuclear reactor cooling system comprises a cooling water tank 3 disposed above a containment 1; a spray header 4 connected to the cooling water tank 3 through a first communicating pipe 5; and an air tank disposed inside the containment; wherein the spray header 4 is disposed outside the containment 1 and used for spraying cooling water to an outer wall of the containment; the cooling water tank is a closed container, and the air tank is connected to a top portion of the cooling water tank through a second communicating pipe 6.

Specifically, the cooling water tank 3 is used to store the cooling water which is used as containment coolant. Disposing the cooling water tank 3 above the containment 1 makes the cooling water in the cooling water tank 3 flow into the spray header 4 through the first communicating pipe 5 under gravity and spray to the outer wall of the containment via the spray header by the spray header 4, cooling the containment 1. Meanwhile, the air tank 8 used to store gas is disposed inside the containment 1 with its internal pressure affected by the temperature in the containment 1, therefore once the cooling water leak happens in the primary circuit, the temperature in the containment 1 increases and the gas in the air tank 8 expands, increasing the pressure in the cooling water tank 3. The increased pressure allows the cooling water flow into the spray header 4 more quickly, increasing the flow rate of the cooling water. The faster the temperature in the containment 1 increases, the larger the flow rate is, enhancing the cooling ability to the containment 1, bringing higher reliability of the cooling system.

Embodiment 2

As is shown in the FIGURE, in this embodiment according to embodiment 1, in order to get a full contact between the outer wall of the containment 1 and the cooling water so as to improve the cooling effect for the containment 1 and in order to collect the cold fluid after the heat exchange between the containment and the cooling water, the nuclear reactor cooling system further comprises a bell shaped shield 2, wherein the shield 2 is used for covering the containment 1 and setting the containment 1 in its interior, a space 9 between an inner wall of the shield 2 and the outer wall the containment 1 is formed, the spray header 4 is disposed in the space 9 which is used as a flow passage for the cold fluid, wherein the cold fluid is formed by the heat exchange between the cooling water and the containment 1, including liquid cooling water and gaseous steam. The cooling water tank 3 is disposed on a top portion of the shield 2.

Further, the nuclear reactor cooling system further comprises an exhaust hole 11 disposed on the top portion of the shield 2 connecting the space 9 between the shield 2 and the containment 1 with the outer space of the shield so as to stop the temperature of the cold fluid outside the containment 1 from increasing to a high level to affect the heat exchange between the cold fluid and the containment 1.

Further, the cooling water tank 3 has a shape of annulus and its axis is collinear with the axis of the shield 2, providing strong ability for supporting, bringing stronger stability of the nuclear reactor cooling system.

Further, the nuclear reactor cooling system further comprises a cooling water outlet 10 disposed on a bottom portion of the shield 2 to discharge the cold fluid in the space between the shield 2 and the containment 1 timely, bringing high-efficiency cooling for the containment 1.

Further, for there are many communicating pipes and nozzles disposed on the spray header 4, axisymmetrically disposed above the containment, the spray header 4 cools the containment uniformly from side and have a strong structural stability, enabling stronger stability of the nuclear reactor cooling system.

Embodiment 3

As is shown in the FIGURE, in this embodiment according to embodiment 1 or embodiment 2, the nuclear reactor cooling system further comprises a rupture disk 7. During the normal operation of the reactor, the temperature in the containment 1 fluctuates in a small range resulting in small change of the pressure in the containment 1, so that the cooling water stored in the cooling water tank 3 can spray out in normal condition, in order to avoid the aforementioned situation, a rupture disk is disposed in the air tank 8 and/or in the second communicating pipe 6, wherein the rupture disk 7 is ruptured during an increase of pressure in the air tank 8, and the rupture disk 7 in an intact state is capable of isolating a space on both sides thereof. The rupture disk 7 is preferably fixed in a pipe which is removable from the second communicating pipe 6 and located outside the containment 1, so as to replace the rupture disk 7 or the assembly of rupture disk 7 and the pipe after the rupture of the repture disk. In this way, when the pressure in the space between the air tank 8 and the rupture disk 7 increases to a certain pressure, the rupture disk 7 ruptures and the cooling water in the cooling water tank 3 flows into the spay header 4 and is spayed to the outer wall of the containment 1, cooling the containment 1.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A nuclear reactor cooling system, comprising:
   a cooling water tank disposed above a containment and containing cooling water therein;
   a spray header connected to the cooling water tank through a first communicating pipe; and
   an air tank disposed inside the containment; wherein the spray header is disposed outside the containment and used for spraying the cooling water to an outer wall of the containment; the cooling water tank is a closed container, and the air tank is connected to a top portion of the cooling water tank through a second communicating pipe, and the nuclear reactor cooling system further comprises a bell-shaped shield around an exterior of the containment.

2. The nuclear reactor cooling system according to claim 1, wherein the shield is used for covering the containment and setting the containment in its interior, the spray header is disposed in a space between an inner wall of the shield and the outer wall the containment, and the cooling water tank is disposed on a top portion of the shield.

3. The nuclear reactor cooling system according to claim 2, further comprising an exhaust hole disposed on the top portion of the shield.

4. The nuclear reactor cooling system according to claim 3, wherein the cooling water tank has a shape of annulus, the axis of the cooling water tank is collinear with the axis of the shield.

5. The nuclear reactor cooling system according to claim 3, further comprising a rupture disk disposed in the air tank and/or in the second communicating pipe, wherein the rupture disk is ruptured during an increase of pressure in the air tank, and the rupture disk in an intact state is capable of isolating a space on both sides thereof.

6. The nuclear reactor cooling system according to claim 4, further comprising a rupture disk disposed in the air tank and/or in the second communicating pipe, wherein the rupture disk is ruptured during an increase of pressure in the air tank, and the rupture disk in an intact state is capable of isolating a space on both sides thereof.

7. The nuclear reactor cooling system according to claim 2, further comprising a cooling water outlet disposed on a bottom portion of the shield.

8. The nuclear reactor cooling system according to claim 7, further comprising a rupture disk disposed in the air tank and/or in the second communicating pipe, wherein the rupture disk is ruptured during an increase of pressure in the air tank, and the rupture disk in an intact state is capable of isolating a space on both sides thereof.

9. The nuclear reactor cooling system according to claim 2, wherein the spray header is axisymmetrically disposed above the containment.

10. The nuclear reactor cooling system according to claim 9, further comprising a rupture disk disposed in the air tank and/or in the second communicating pipe, wherein the rupture disk is ruptured during an increase of pressure in the air tank, and the rupture disk in an intact state is capable of isolating a space on both sides thereof.

11. The nuclear reactor cooling system according to claim 2, further comprising a rupture disk disposed in the air tank and/or in the second communicating pipe, wherein the rupture disk is ruptured during an increase of pressure in the air tank, and the rupture disk in an intact state is capable of isolating a space on both sides thereof.

12. The nuclear reactor cooling system according to claim 1, further comprising a rupture disk disposed in the air tank and/or in the second communicating pipe, wherein the rupture disk is ruptured during an increase of pressure in the air tank, and the rupture disk in an intact state is capable of isolating a space on both sides thereof.

* * * * *